United States Patent
Kondo et al.

[11] Patent Number: 5,870,434
[45] Date of Patent: *Feb. 9, 1999

[54] APPARATUS AND METHOD FOR QUANTIZING A DIGITAL SIGNAL BASED ON QUANTIZING STEPS INCLUDING ODD-NUMBERED STEPS

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 576,315

[22] Filed: Dec. 21, 1995

[30] Foreign Application Priority Data

Dec. 29, 1994 [JP] Japan .................. 6-338553

[51] Int. Cl.⁶ .................................. H04B 14/06
[52] U.S. Cl. .................. 375/242; 375/245; 341/143; 348/472
[58] Field of Search .................. 375/242, 243, 375/244, 245; 341/67, 143, 200; 348/472; 704/212

[56] References Cited

U.S. PATENT DOCUMENTS

| | | | |
|---|---|---|---|
| 5,136,615 | 8/1992 | Tanoi | 375/245 |
| 5,291,286 | 3/1994 | Murakami et al. | 348/469 |
| 5,555,273 | 9/1996 | Ishino | 375/244 |
| 5,587,708 | 12/1996 | Chiu | 341/76 |

FOREIGN PATENT DOCUMENTS

| | | |
|---|---|---|
| 0 470 773 A2 | 2/1992 | European Pat. Off. . |
| 0 479 510 A2 | 4/1992 | European Pat. Off. . |
| 0 627 859 A2 | 12/1994 | European Pat. Off. . |
| 43 08 263 A | 9/1994 | Germany . |
| WO 88/10544 | 12/1988 | WIPO . |

OTHER PUBLICATIONS

Zetterberg, L. H.; Ericsson, S.; Couturier, C.: "DPCM Picture Coding with Two-Dimensional Control of Adaptive Quantization", IEEE Transactions on Communications, vol. COM-32, No. 4, Apr. 1983, pp. 457-462, XP002055655.

Burt, Peter J. and Adelson, Edward H.: "The Laplacian Pyramid as a Compact Image Code", IEEE Transactions on Communications, vol. COM-31, No. 4, Apr. 1983, pp. 532-540, XP000570701.

*Primary Examiner*—Chi H. Pham
*Assistant Examiner*—Bryan Webster
*Attorney, Agent, or Firm*—Frommer Lawrence & Haug, LLP; William S. Frommer

[57] ABSTRACT

A subtraction device subtracts a predicted value generated by a predicting portion from a digital picture signal supplied through an input terminal. The subtraction device generates a difference signal as an output signal. A quantizing portion detects an activity of the difference signal, designates the number of quantizing steps corresponding to the activity, and quantizes the difference signal with the number of quantizing steps. The quantizing portion outputs side information to an output terminal.

8 Claims, 7 Drawing Sheets

Fig. 6

| NUMBER OF STEPS | QUANTIZING CODE | HUFFMAN CODE |
|---|---|---|
| 1 | 1 | 0 |
| 3 | 1 | 1 0 |
| | 2 | 0 |
| | 3 | 1 1 |
| 5 | 1 | 1 1 0 0 |
| | 2 | 1 0 0 |
| | 3 | 0 |
| | 4 | 1 0 1 |
| | 5 | 1 1 0 1 |
| 7 | 1 | 0 0 1 0 0 |
| | 2 | 0 0 0 |
| | 3 | 0 1 |
| | 4 | 1 0 |
| | 5 | 1 1 |
| | 6 | 0 0 1 1 |
| | 7 | 0 0 1 0 1 |

FIFTH HIERARCHICAL LEVEL
BLOCK SIZE(1/16×1/16)

FOURTH HIERARCHICAL LEVEL
BLOCK SIZE(1/8×1/8)

THIRD HIERARCHICAL LEVEL
BLOCK SIZE(1/4×1/4)

SECOND HIERARCHICAL LEVEL
BLOCK SIZE(1/2×1/2)

FIRST HIERARCHICAL LEVEL
BLOCK SIZE(1×1)

APPARATUS AND METHOD FOR QUANTIZING A DIGITAL SIGNAL BASED ON QUANTIZING STEPS INCLUDING ODD-NUMBERED STEPS

BACKGROUND OF THE INVENTION

1. Field of the Invention

The present invention relates to a quantizing apparatus and method for quantizing the difference between an input signal (such as a digital audio signal or a digital picture signal) and a predicted value generated therefrom.

2. Description of the Related Art

A prediction encoding method for compressing the transmission information amount of a digital audio signal, a digital picture signal, and so forth is known. For example, in one-dimensional DPCM, the difference between an input sample value and a predicted value is formed in time direction. On the other hand, in two-dimensional DPCM, the difference between an input sample value and a predicted value is formed in spatial direction. Since a digital information signal has a correlation in time direction and in spatial direction, the difference concentrates on around 0. Thus, the difference signal can be quantized with the number of bits smaller than the number of quantizing bits. Consequently, the information amount can be reduced. In addition, when the variable length encoding process is performed using the characteristic of the concentration of the distribution of the difference signal, the information amount can be more reduced.

In the distribution of the frequency of the difference signal, values concentrate on around 0. Thus, in a conventional quantizing apparatus that deals with the difference signal, the quantizing step width at around 0 is finely designated. As the level becomes large, the quantizing step width is coarsely designated. This quantizing apparatus is referred to as a non-linear quantizing apparatus. In the conventional quantizing apparatus including the non-linear quantizing apparatus, all possible levels of the difference signal are quantized. For example, when one sample (one pixel) of a digital picture signal is quantized with eight bits, the values of the difference signal range from −255 to +255. In the conventional quantizing apparatus, all the range is used for the quantizing process.

In the conventional quantizing apparatus, the number of quantizing steps is restricted to even numbers so as to represent quantized values in binary notation. In the case that the number of quantizing steps is restricted to even numbers, when difference data is quantized with 0 as a decoded value, the quantized values are not symmetrical with respect to 0. Alternatively, even if the number of quantizing steps is 2n−1, since 2n should be used as the number of quantizing steps, there is a loss.

When the number of quantizing bits is changed from 2 to 3, the number of quantizing steps is increased from 4 to 8. Thus, as this example shows, the number of quantizing steps largely varies corresponding to the number of quantizing bits. This means that the variation of the number of quantizing bits for keeping the transmission data amount constant causes the quantizing step width to largely vary, thereby largely changing the restored picture quality.

OBJECTS AND SUMMARY OF THE INVENTION

An object of the present invention is to provide a quantizing apparatus and method that is regardless of whether the number of quantizing steps is an odd number or an even number and that suppresses the variation of the number of quantizing steps.

According to an aspect of the present invention, there is provided a quantizing apparatus, comprising, a device for receiving an input digital signal and quantizing circuit for quantizing the input digital signal corresponding to the number of quantizing steps including an odd step number so as to determine a quantized code and for matching a variable-length code with the quantized code so as to generate a quantized value.

The present invention further includes a memory for receiving the quantized code and having a code converting table for outputting a variable-length quantized value corresponding to the quantized code, wherein the quantized value is transmitted.

According to another aspect of the invention, there is provided a quantizing method, comprising the steps of, receiving an input digital signal, and quantizing the input digital signal corresponding to the number of quantizing steps including an odd step number so as to determine a quantized code and matching a variable-length code with the quantized code so as to generate a quantized value.

When the difference data (difference signal) is quantized, even if 0 is included in a decoded value, the difference data can be symmetrically quantized with respect to 0. When the optimum number of quantizing steps is 2n−1, the difference data can be quantized with the optimum number of quantizing steps.

The above, and other, objects, features and advantage of the present invention will become readily apparent from the following detailed description thereof which is to be read in connection with the accompanying drawings.

BRIEF DESCRIPTION OF THE DRAWINGS

FIG. 6 is a schematic diagram for explaining a variable length encoding process according to the present invention;

DETAILED DESCRIPTION OF THE PREFERRED EMBODIMENTS

Figure 1A:
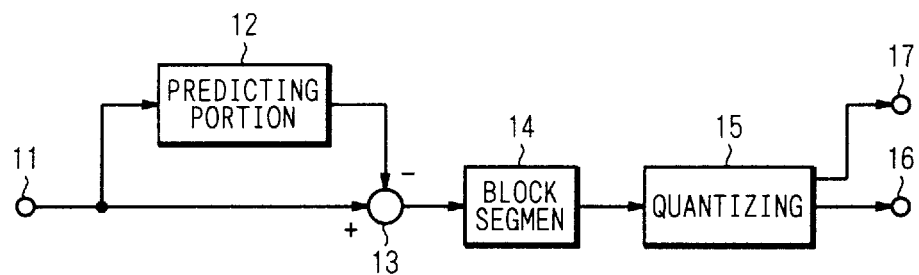
FIGS. 1A and 1B are block diagrams showing a prediction code encoder according to the present invention.
Figure 1B:
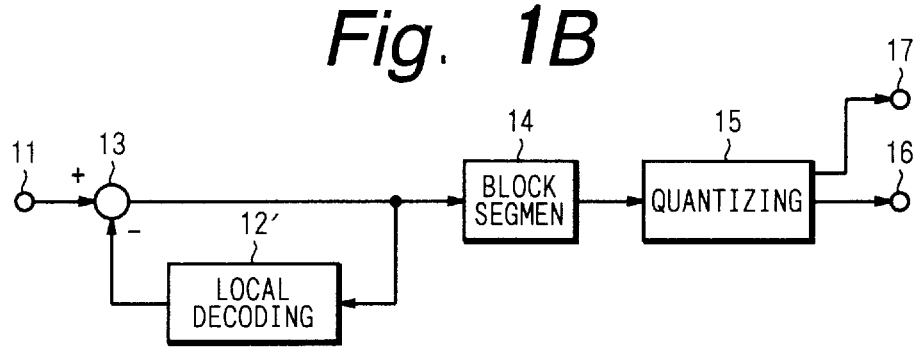

Next, with reference to the accompanying drawings, an embodiment of the present invention will be described. FIGS. 1A and 1B show examples of a prediction code encoder that generates a difference signal. In FIG. 1A, for example a digital picture signal is supplied to an input terminal 11. The digital picture signal is supplied to a predicting portion 12 and a subtraction device 13. The subtraction device 13 subtracts a predicted value generated by the predicting portion 12 from each pixel value and generates a difference signal as an output signal.

Figure 4:
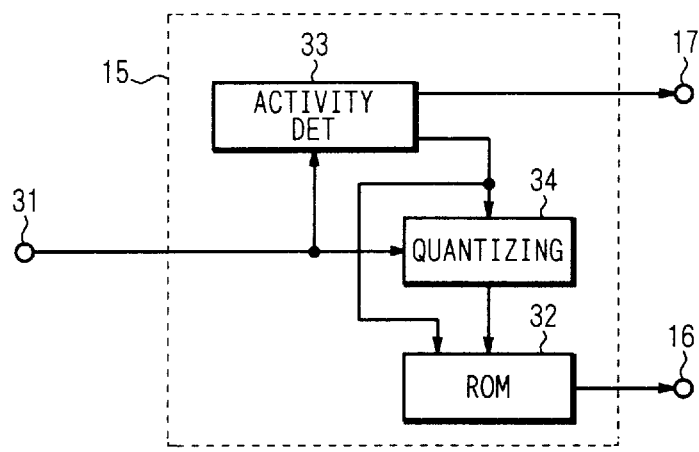
FIG. 4 is a block diagram showing a quantizing apparatus according to an embodiment of the present invention.

The difference signal is supplied to a quantizing portion 15 through a block segmenting circuit 14. The quantizing portion 15 quantizes the difference signal with the number of quantizing bits smaller than the original number of quantizing bits. The present invention is applied for the quantizing portion 15 and an embodiment thereof is shown in FIG. 4. The quantizing portion 15 generates a quantized output (quantized value) and side information. The quantized value is obtained from an output terminal 16. The side information is obtained from an output terminal 17. In reality, as shown in FIG. 1B, the output signal of the subtraction device 13 is supplied to a local decoding device 12'. A decoded output signal is supplied from the local decoding device 12' to the subtraction device 13.

Figure 2:
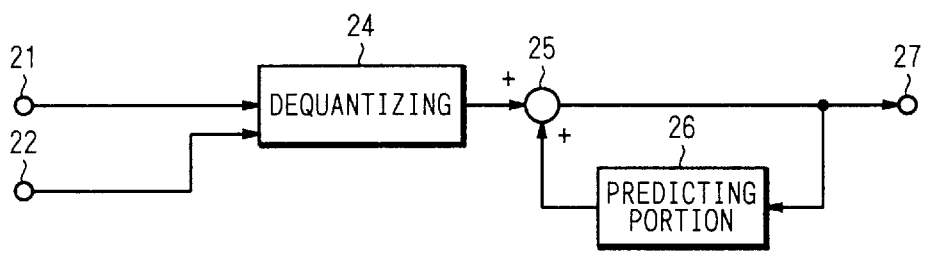
FIG. 2 is a block diagram showing a prediction code decoder according to the present invention.

FIG. 2 shows a decoder corresponding to the encoder shown in FIGS. 1A and 1B. A quantized value and side information are supplied to input terminals 21 and 22, respectively. The quantized value and the side information are supplied to a dequantizing portion 24. The dequantizing portion 24 dequantizes the quantized value to a dequantized value (representative value).

The dequantized value is supplied from the dequantizing portion 24 to an addition device 25. An output signal of the addition device 25 is supplied to an output terminal 27 and a predicting portion 26. The predicting portion 26 generates a predicted value and supplies it to the addition device 25. When a sample value for refreshing is periodically inserted for preventing errors of the encoder from being cumulated, the addition device 25 supplies the dequantized value to the output terminal 27 without performing the addition.

Figure 3:
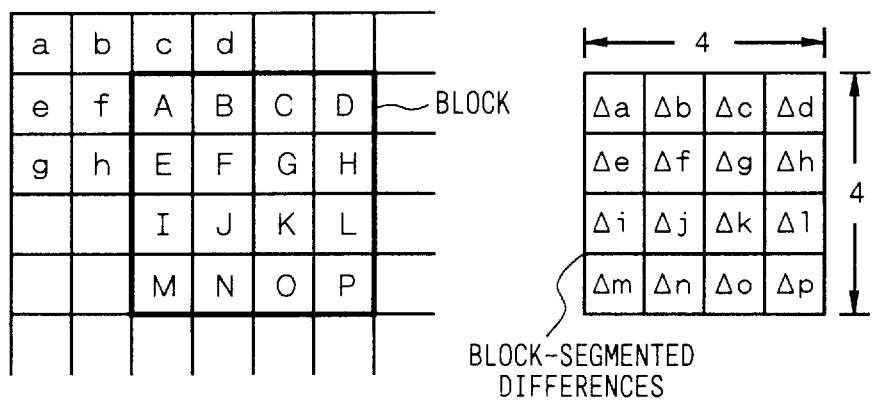
FIG. 3 is a schematic diagram for explaining an example of prediction encoding process.

FIG. 3 shows a part of one screen for explaining an example of the prediction. In FIG. 3, a to h represent locally decoded pixel values. A to P represent pixel values that have not been encoded. A predicted value A' corresponding to the pixel value A is formed of adjacent locally-decoded pixel values. A predicated value of the pixel value A is formed of for example A'=4c−3(b−f), A'=f+c−d, and so forth. A predicted value of the pixel value B is formed of a locally decoded value by the similar arithmetic operations.

For example, a predicted value (for example, A') is subtracted from a real pixel value (for example, A). (Namely, Δa=A−A' is calculated). Thus, the difference Δa is formed. As shown in FIG. 3, the difference is block segmented into a block composed of 4 pixels×4 pixels by the block segmenting circuit 14. When a digital audio signal is handled, a predicate value is formed in time direction and thereby a block of a one-dimensional difference signal is formed.

FIG. 4 shows a detailed construction of the quantizing portion 15 according to the embodiment. A difference signal supplied from the subtraction device 13 is supplied to the quantizing portion 15. The quantizing portion 15 includes a ROM 32, a quantizing device 34 and an activity detecting circuit 33. As described above, the block segmenting circuit 14 segments the difference signal into a block composed of 4 pixels×4 pixels. The block-segmented data is supplied to the activity detecting circuit 33 and the quantizing device 34.

As an example of an activity determining method performed by the activity detecting circuit 33, a dynamic range is used. Besides the dynamic range, it is possible to use the sum of the absolute values of the differences against the average value, the absolute values of the standard deviation, and so forth as activities.

The activity detecting circuit 33 determines a quantizing characteristic corresponding to the detected activity. In this example, the activity detecting circuit 33 determines the number of quantizing steps and supplies a control signal that represents the number of quantizing steps to the quantizing device 34 and t he ROM 32. The quantizing device 34 quantizes the data of the block-segmented difference signal with the number of the quantizing steps. An ID that represents the number of quantizing steps as side information is supplied from the activity detecting circuit 33 to the output terminal 17. A quantized code and the ID are supplied to the ROM 32 as its address. A variable length code is read out from the ROM 32, and the code is supplied to an output terminal 35.

Figure 5:
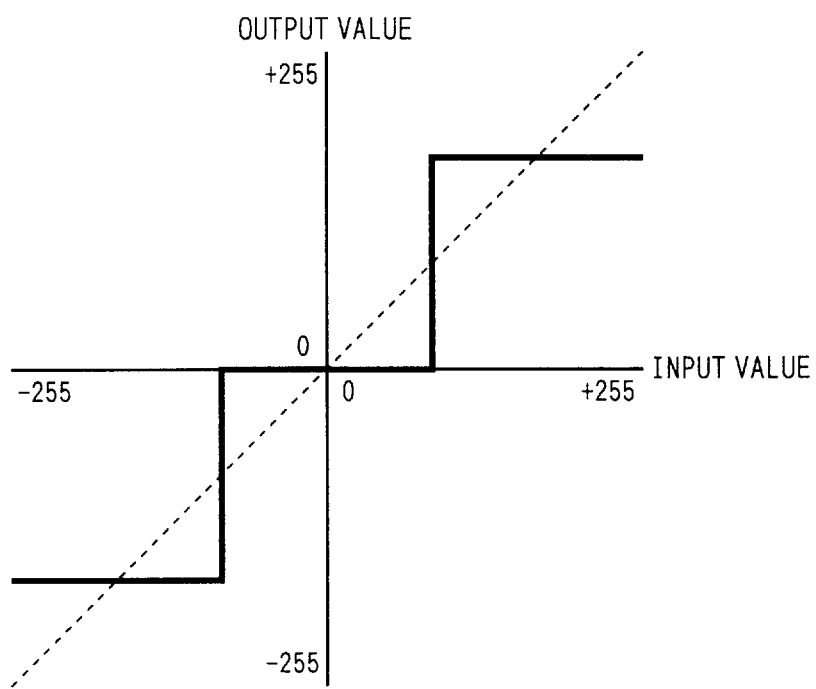
FIG. 5 is a schematic diagram for explaining the number of quantizing steps.

Since the quantizing portion 15 is constituted so as to integrate the quantizing device 34 and the ROM 32 for variable length coding, unlike with a conventional even number of quantizing steps, an odd number of quantizing steps can be used. In other words, the quantized value of the variable length code process is transmitted or recorded. Thus, before this process, the number of quantizing steps can be freely selected. Consequently, when the variable length code converting table stored in the ROM 32 is properly designed, the information amount to be transmitted can be suppressed from increasing. Next, an example of the code converting table will be described. In this example, the number of quantizing steps is 3 for simple explanation. In FIG. 5, the relation between input values (quantized codes from the quantizing device 34) (−255 to +255) and output values read out from the ROM 32 (−255 to +255) are shown. When the number of quantizing steps is an odd number (3), the representative value of one quantizing code is always 0. In addition, a quantizing step width Δ can be symmetrically designated with respect to zero.

The activity detecting circuit 33 detects the maximum values MAX and the minimum value MIN of the level distribution of the difference signal of the block and calculates the dynamic range DR (=MAX−MIN) in the above-descried manner. When the detected dynamic range DR is in the range from 0 to 63, the number of quantizing steps is designated to 1. When the detected dynamic range DR is in the range from 64 to 128, the number of quantizing steps is designated to 3. When the detected dynamic range DR is in the range from 129 to 191, the number of quantizing steps is designated to 5. When the detected dynamic range DR is in the range from 192 to 255, the number of quantizing steps is designated to 7. The quantizing step width Δ is designated corresponding to the odd number of quantizing steps.

The table shown in FIG. 6 is stored in the ROM 32. This table defines the relation among the number of quantizing steps, the quantizing code, and the Huffman code as an example of variable length code. As shown in FIG. 6, when the number of quantizing steps is 1, the quantizing code is 1 and the Huffman code is 0. When the number of quantizing steps is 3, the quantizing code is 1, 2, or 3. When the quantizing code is 1, the Huffman code is 10. When the quantizing code is 2, the Huffman code is 0. When the quantizing code is 3, the Huffman code is 11. When the number of quantizing steps is 5, the quantizing code is 1, 2, 3, 4, or 5. When the quantizing code is 1, the Huffman code is 1100. When the quantizing code is 2, the Huffman code is 100. When the quantizing code is 3, the Huffman code is 0. When the quantizing code is 4, the Huffman code is 101. When the quantizing code is 5, the Huffman code is 1101.

When the number of quantizing steps is 7, the quantizing code is 1, 2, 3, 4, 5, 6, or 7. When the quantizing code is 1, the Huffman code is 00100. When the quantizing code is 2, the Huffman code is 000. When the quantizing code is 3, the Huffman code is 01. When the quantizing code is 4, the Huffman code is 10. When the quantizing code is 5, the Huffman code is 11. When the quantizing code is 6, the Huffman code 0011. When the quantizing code is 7, the Huffman code is 00101. Thus, a small number of bits are designated to a quantizing code corresponding to level 0 that has a large occurrence frequency. In contrast, a large number of bits are designated to a quantizing code that has a small occurrence frequency. Consequently, the number of bits to be transmitted can be totally reduced. The selection of the number of quantizing steps and the variable length code table are only examples. Thus, it should be noted that another quantizing characteristic and another variable length code can be used.

The present invention can be applied for a quantizing apparatus for a hierarchical code encoder that will be described later as well as the prediction code encoder shown in FIG. 1. In the following hierarchical encoding apparatus, predications are performed between hierarchical levels. By using simple arithmetic expressions for the hierarchical data, the number of pixels to be encoded can be prevented from increasing.

Figure 7:
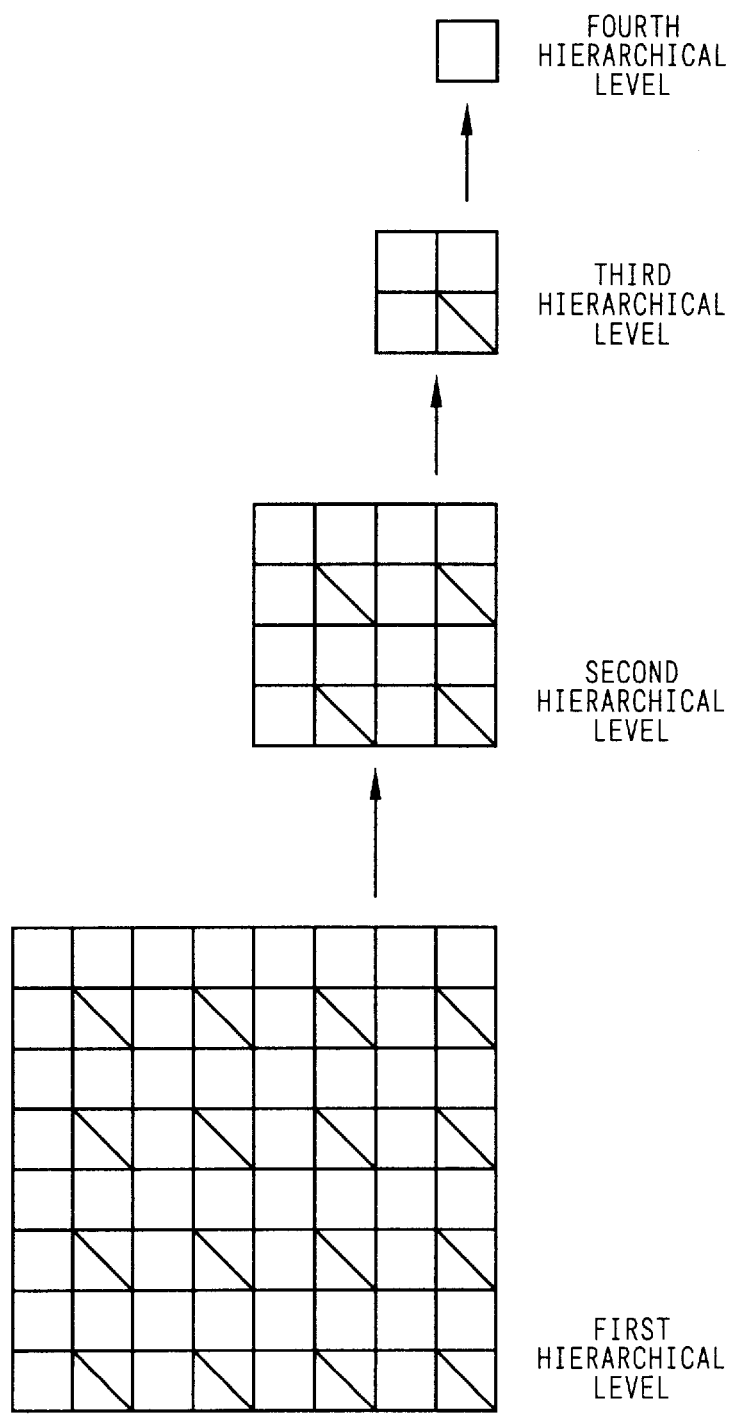
FIG. 7 is a schematic diagram for explaining an example of a hierarchical encoding process according to the present invention.

Next, with reference to FIG. 7, the hierarchical encoding method will be described. FIG. 7 is a schematic diagram showing that the first hierarchical level is the lowest hierarchical level (original picture) and the fourth hierarchical level is the highest hierarchical level. For example, as a higher hierarchical level data generating method, when an averaging method for averaging four spatially corresponding pixels in a lower hierarchical level is used, assuming that the higher hierarchical data is denoted by M and the lower hierarchical pixel values are denoted by $x_0$, $x_1$, $x_2$, and $x_3$, the number of pixels to be transmitted is still 4, not increases.

In other words, using M, $X_0$, $X_1$, and $X_2$, the not-transmitted pixel $x_3$ can be easily restored by the following simple arithmetic expression.

$$X_3 = 4 \cdot M - (X_0 + X_1 + X_2) \quad (1)$$

Each hierarchical data is generated by averaging the four pixels in the lower hierarchical level. Thus, even if data of the hatched portions in the drawing, all data can be restored corresponding to the formula (1).

Figure 8:
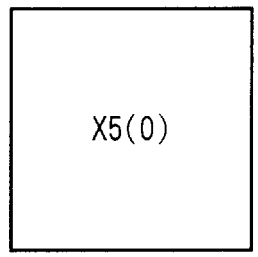
FIG. 8 is a schematic diagram for explaining an example of a the hierarchical encoding process.
Figure 8:
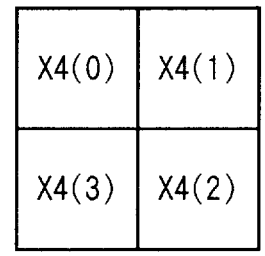
Figure 8:
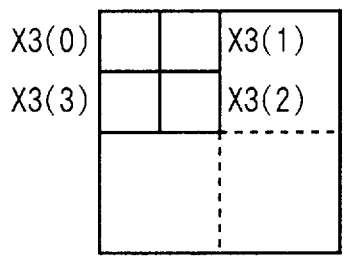
Figure 8:
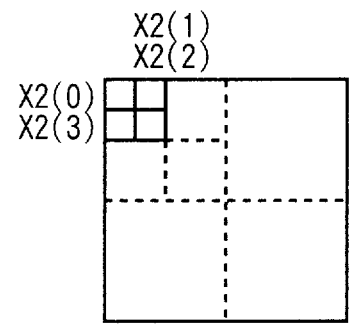
Figure 8:
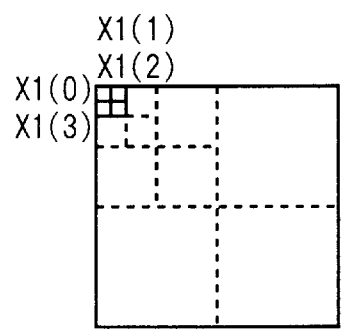

FIG. 8 shows an example of the structure of five hierarchical levels of hierarchical data formed by the averaging method. It is assumed that the first hierarchical level is the level with the resolution of the input picture. In the first hierarchical level, data is composed in a block size (1×1). In the second hierarchical level, data is composed by averaging four pixels in the first hierarchical level. In this example, data $X_2(0)$ in the second hierarchical level is generated by the average value of data $X_1(0)$ to $X_1(3)$ in the first hierarchical level. Data $X_2(1)$ to $X_2(3)$ adjacent to $X_2(0)$ in the second hierarchical level are generated by averaging respective four pixels in the first hierarchical level. In the second hierarchical level, data is composed in a block size (½×½).

Data in the third hierarchical level is generated by averaging spatially corresponding four pixels in the second hierarchical level. Likewise, data the third hierarchical level is composed in block size (¼×¼). Likewise, data in the fourth hierarchical level is controlled corresponding to data in the third hierarchical level. Data in the third hierarchical level is composed in a block size (⅛×⅛). Data $X_5(0)$ in the fifth hierarchical level, which is the highest hierarchical level, is generated by averaging data $X_4(0)$ to $X_4(3)$ in the fourth hierarchical level. Data in the fifth hierarchical is composed in a block size (1/16×1/16).

Figure 9:
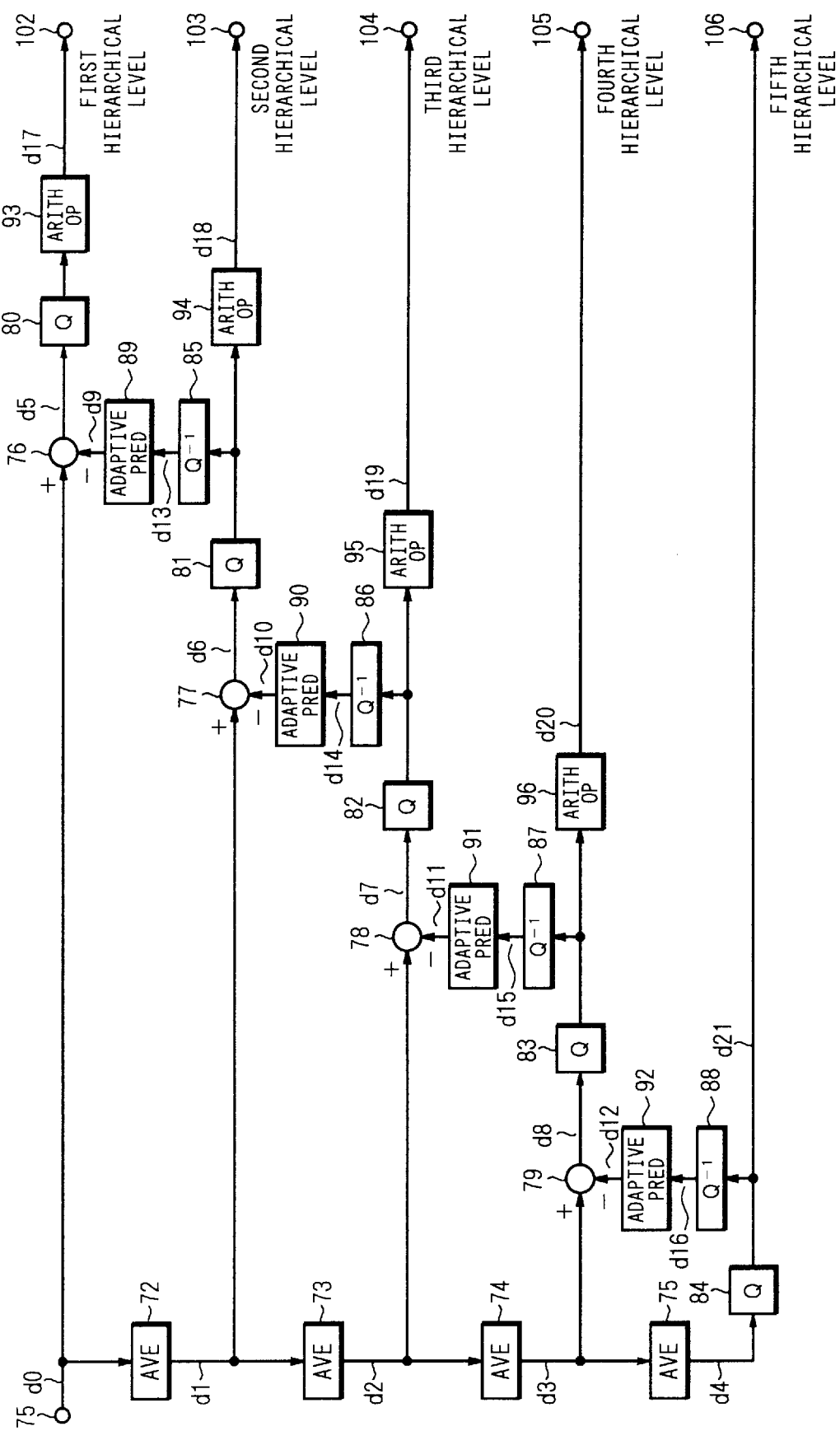
FIG. 9 is a block diagram showing an example of the construction of an encode side of the hierarchical encoding process.

By applying a class categorizing adaptive predicting process for data in a higher hierarchical level, data in a lower hierarchical level can be predicted. By generating the difference between the data in the lower hierarchical level and the predicted value (namely, the difference signal), the signal power can be reduced. Next, an example of the construction for reducing the signal power will be described with reference to a block diagram shown in FIG. 9. FIG. 9 shows an example of the construction of the hierarchical code encoder. Data d0 in the first hierarchical level is supplied as input picture data d0 to an averaging circuit 72 and a subtraction device 76 through an input terminal 71. The data in the first hierarchical level is picture data with the original resolution.

The averaging circuit 72 performs a ¼ averaging process of a (2 pixels×2 pixels) block shown in FIG. 8 for the input pixel data d0 and generates hierarchical data d1. The hierarchical data d1 accords with data in the second hierarchical level shown in FIG. 8. The hierarchical data d1 is supplied to an averaging circuit 73 and a subtraction device 77.

The averaging circuit 73 performs the same process as the averaging circuit 72 for the hierarchical data d1. The hierarchical data d2 accords with data in the third hierarchical level. The generated hierarchical data d2 is supplied to an averaging circuit 74 and a subtraction device 78. The averaging circuit 74 performs the same process as the averaging circuits 72 and 73 for the hierarchical data d2 and generates the hierarchical data d3. The hierarchical data d3 accords with data in the fourth hierarchical level. The generated hierarchical data d3 is supplied to an averaging circuit 75 and a subtraction device 79. The averaging circuit 75 performs the same process as the averaging circuits 72, 73, and 74 for the hierarchical data d3 and generates the hierarchical data d4. The hierarchical data d4 accords with data in the fifth hierarchical level. The generated hierarchical data d4 is supplied to a quantizing device 84.

Data in five hierarchical levels is predicted between each hierarchical level. In the fifth hierarchical level, the quantizing portion 84 performs the quantizing process for compressing data. Output data d21 of the quantizing portion 84 is supplied a dequantizing portion 88. Output data of the quantizing portion 84 is obtained as data in the fifth hierarchical level to an output terminal 106. Output data d16 of the dequantizing portion 88 is supplied to a class categorizing adaptive predicting circuit 92.

The class categorizing adaptive predicting circuit 92 performs the predicting process for the data d16 and generates a predicted value d12 of the data in the fourth hierarchical level. The predicted value d12 is supplied to a subtraction device 79. The subtraction device 79 obtains the difference between the hierarchical data d3 supplied from the averaging circuit 74 and the predicted value d12 and supplies a difference value d8 to a quantizing portion 83.

The quantizing portion 83 performs the same compressing process as the quantizing portion 84. Output data of the quantizing portion 83 is supplied to an arithmetic operation device 96 and a dequantizing portion 87. The arithmetic operation device 96 decimates one pixel from four pixels. Data d20 from the arithmetic operation device 96 is obtained as data in the fourth hierarchical level from an output terminal 105.

Output data d15 of the dequantizing portion 87 is supplied to a class categorizing adaptive predicting circuit 91. The class categorizing adaptive predicting circuit 91 performs the predicting process for the data d15 and generates a predicted value d11 of the data in the third hierarchical level. The predicted data d11 is supplied to the subtraction device 78. The subtraction device 78 obtains the difference between the data d2 supplied from the averaging circuit 3 and the predicted value d11 and supplies a difference value d7 to a quantizing portion 82.

Output data of the quantizing portion 82 is supplied to an arithmetic operation device 95 and a dequantizing portion 86. The arithmetic operation device 95 decimates one pixel from fourth pixels. Data d19 in the third hierarchical level from the arithmetic operation device 95 is obtained as data in the third hierarchical level from an output terminal 104.

Output data d14 of the dequantizing portion 86 is supplied to a class categorizing adaptive predicting circuit 90. The class categorizing adaptive predicting circuit 90 performs the predicting process for the data d14 and generates a predicted value d10 of data in the second hierarchical level. The predicted value d10 is supplied to the subtraction device 77. The subtraction device 77 obtains the difference between the data d1 supplied from the averaging circuit 72 and the predicted value d10 and supplies a difference value d6 to a quantizing portion 81.

Output data of the quantizing portion 81 is supplied to an arithmetic operation device 94 and a dequantizing portion 85. The arithmetic operation device 94 decimates one pixel from four pixels. Data d18 in the second hierarchical level from the arithmetic operation device 94 is obtained as data in the second hierarchical level from an output terminal 103.

Output data d13 of the dequantizing portion 85 is supplied to a class categorizing adaptive predicting circuit 89. The class categorizing adaptive predicting circuit 89 performs the predicting process for the data d13 and generates a predicted value d9 of data in the first hierarchical level. The predicted value d9 is supplied to the subtraction device 76. The subtraction device 76 obtains the difference between the input pixel data d0 supplied from the input terminal 71 and the predicted value d9 and supplies a difference value d5 to a quantizing portion 80.

Output data of the quantizing portion 80 is supplied to an arithmetic operation device 93. The arithmetic operation device 93 decimates one pixel from four pixels. Data d17 in the first hierarchical level from the arithmetic operation device 93 is obtained as data in the first hierarchical level from an output terminal 102.

The quantizing portions 80 to 84 have same constitutions as shown in FIG. 4, respectively. That is, the quantizing portion can quantize the data of the block-segmented difference by the odd number of quantizing steps defined in response to the detected activity, and has the ROM for variable length coding. The dequantizing portions convert the equantized value having variable length to the quantized code, and then convert the quantized code to the representative value, respectively.

The class categorizing adaptive predicting circuits 89, 90, 91, and 92 categorizes classes of pixels in lower hierarchical levels to be predicted corresponding to the level distribution of a plurality of spatially adjacent pixels (included in the higher hierarchical levels). A table for predicted coefficients corresponding to individual classes or predicted values that have been learnt is stored in memory. A plurality of predicted coefficients for individual classes or one predicted value is read from the memory. The predicted value is used as it is. Predicted coefficients and a plurality of pixels are linearly combined so as to generate a predicted value. Such a class categorizing adaptive predicting method has been disclosed in Japanese Patent Application No. HEI 4-155719 by the applicant of the present invention.

Figure 10:
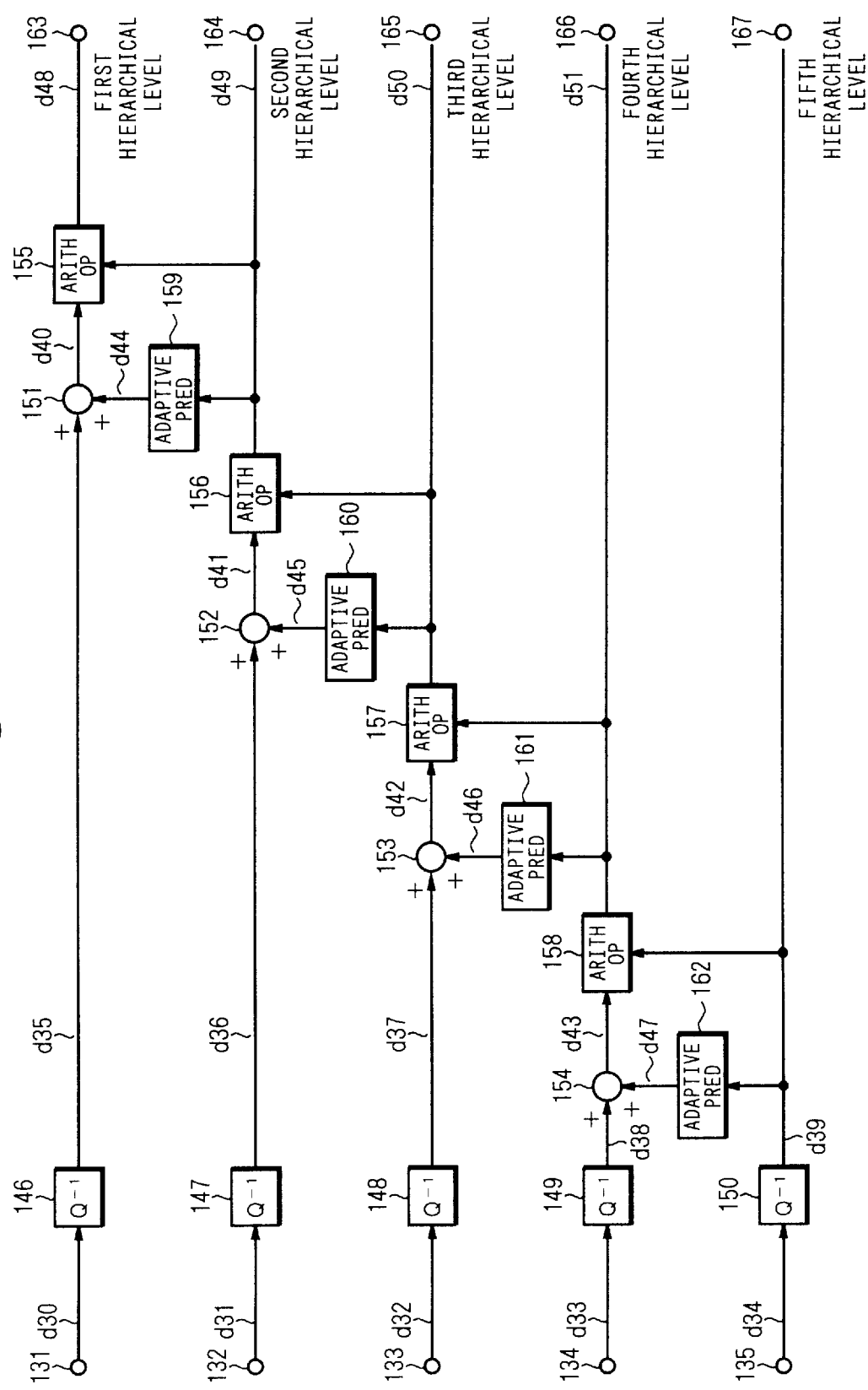
FIG. 10 is a block diagram showing an example of the construction of a decode side of the hierarchical encoding process.

FIG. 10 shows an example of the construction of a hierarchical code decoder corresponding to the encoder. Data in individual hierarchical levels generated by the encoder is input as d30 to d34 to terminals 131, 132, 133, 134 and 135. The data of each hierarchical level is supplied to dequantizing portion 146, 147, 148, 149, and 150, respectively.

The dequantizing portion 150 performs the decoding process for the input data d34 in the fifth hierarchical level and generates picture data d39. The picture data d39 is supplied to a class categorizing adaptive predicting circuit 162 and an arithmetic operation device 158. In addition, the picture data d39 is obtained as picture output data in the fifth hierarchical level from an output terminal 167.

The class categorizing adaptive predicting circuit 162 performs the class categorizing adaptive predicting process for picture data in the fourth hierarchical level and generates a predicted value d47 of data in the fourth hierarchical level. An addition device 154 adds data d38 (namely, a difference value) supplied from the dequantizing portion 149 and the predicted value d47 and supplies picture data d43 to the arithmetic operation device 158. The arithmetic operation device 158 performs the arithmetic operation of the formula (1). Thus, all pixel values in the fourth hierarchical level are restored from the picture data d39 supplied from the dequantizing portion 150 and from the picture data d43. All the pixel values restored by the arithmetic operation device 158 are supplied as picture data d51 to a class categorizing adaptive predicting circuit 161 and an arithmetic operation device 157. In addition, the picture data d51 is output as output data in the fourth hierarchical level from an output terminal 166.

The class categorizing adaptive predicting circuit 161 performs the class categorizing adaptive predicting process for the picture data in the third hierarchical level in the same manner as described above and generates a predicted value d46 in the third hierarchical level. An addition device 153 adds data d37 supplied from the dequantizing portion 148 and the predicted value d46. Picture data d42 of the addition device 153 is supplied to the arithmetic operation device 157. The arithmetic operation device 157 performs the arithmetic operation of the formula (1). Thus, all pixel values in the third hierarchical level are restored from the picture data d51 supplied from the arithmetic operation device 158 and from the picture data d42. All the restored pixel values are supplied as picture data d50 to a class categorizing adaptive predicting circuit 160 and an arithmetic operation device 156. In addition, the picture data d50 is obtained as output data in the third hierarchical level from an output terminal 165.

The class categorizing adaptive predicting circuit 160 performs the class categorizing adaptive predicting process for picture data in the second hierarchical level in the same manner as described above and generates a predicted value d45 of data in the second hierarchical level. An addition device 152 adds data d36 supplied from the dequantizing portion 147 and the predicted value d45. Picture data d41 is output from the addition device 152 and supplied to the arithmetic operation device 156. The arithmetic operation device 156 performs the arithmetic operation of the formula (1). Thus, all pixel values in the second hierarchical level are restored from the picture data d50 supplied from the arithmetic operation device 157 and from the picture data d41. All the restored pixel values are supplied as picture data d49 to a class categorizing adaptive predicting circuit 159 and an arithmetic operation device 155. In addition, the picture data d49 is obtained as output data in the second hierarchical level from an output terminal 164.

The class categorizing adaptive predicting circuit 159 performs the class categorizing adaptive predicting process for picture data in the first hierarchical level in the same manner as described above and generates a predicted value d44 of data in the first hierarchical level. An addition device 151 adds data d35 supplied from the dequantizing portion 146 and the predicted value d44. Picture data d40 is output from the addition device 151 and supplied to an arithmetic operation device 155. The arithmetic operation device 155 performs the arithmetic operation of the formula (1). Thus, all pixel values in the first hierarchical level are restored from the picture data d49 supplied from the arithmetic operation device 156 and the picture data d40. All the restored pixel values are supplied as picture data d48 from the arithmetic operation device 155 and obtained as output data in the first hierarchical level from an output terminal 163. In the hierarchical encoding method for preventing the number of pixels to be encoded from increasing, the encoding efficiency can be improved.

As a real application example of the above-described hierarchical encoding system, when a high-vision TV still picture database is constructed, data in the lowest hierarchical level, namely, data in the first hierarchical level (original picture), is reproduction data with a high-vision resolution. Data in the second hierarchical level is reproduction data with a standard resolution. Data in the highest hierarchical level, namely data in the fifth hierarchical level, is reproduction data with a low resolution for high speed data retrieval.

When a compression encoding process is used for reducing the information amount, reproduction picture data obtained by the decoding apparatus does not always accord with the input original picture data. However, the deterioration of the picture quality can be suppressed so that it cannot be visually detected. In addition, the average value may be obtained by a simple averaging method or a weighted averaging method.

The present invention can be applied for the quantizing process of the difference signal generated by other than the above-described prediction encoding process. In addition, the present invention can be applied for a system having a buffering construction for controlling a quantizing step width $\Delta$ so as to control the generated data amount.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the present invention, as the number of quantizing steps, an odd number can be used. In addition, according to the present invention, when difference data (difference signal) is quantized with 0 as a decoded value, the quantizing characteristic has a symmetry with respect to 0. Moreover, according to the present invention, the degree of freedom of designing a quantizing apparatus is increased and thereby the encoding efficiency can be improved.

What is claimed is:

1. A quantizing apparatus for quantizing an input digital signal based on a plurality of quantizing steps, comprising:

a receiving portion for receiving said input digital signal;

a quantizing portion for determining the quantizing steps for the received input digital signal and for obtaining a quantizing code by quantizing the received input digital signal in response to each of the determined quantizing steps including odd-numbered steps, said quantizing portion including a converting table for storing a respective variable-length quantized value in correspondence with a respective number of quantizing steps and a respective quantizing code such that said quantizing portion produces a variable-length quantized value of said input digital signal based on the corresponding number of quantizing steps and the corresponding quantizing code; and an output portion for outputting said variable-length quantized value.

2. The apparatus according to claim 1, further comprising a first signal representing a plurality of sample values and a second signal representing a plurality of predicted values corresponding to said sample values, and wherein said input digital signal represents a difference between said first and second signals.

3. A quantizing apparatus for quantizing an input digital signal, comprising:

a receiving portion for receiving said input digital signal;

a detecting portion for detecting a local characteristic of the received input digital signal and for selecting a plurality of quantizing steps including odd-numbered steps based on the detected local characteristic;

a quantizing portion for obtaining a quantizing code by quantizing the received input digital signal in response to each of the selected quantizing steps, said quantizing portion including a converting table for storing a respective variable-length quantized value in correspondence with a respective number of quantizing steps and a respective quantizing code such that said quantizing portion produces a variable-length quantized value of the received input digital signal based on the corresponding number of quantizing steps and the corresponding quantizing code; and an output portion for outputting said variable-length quantized value with the corresponding quantizing step.

4. The apparatus according to claim 3, further comprising a first signal representing a plurality of sample values and a second signal representing a plurality of predicted values corresponding to said sample values, and wherein said input digital signal represents a difference between said first and second signals.

5. A quantizing method for quantizing an input digital signal based on a plurality of quantizing steps, said method comprising the steps of:

receiving said input digital signal;

determining the quantizing steps for the received input digital signal;

obtaining a quantizing code by quantizing the received input digital signal in response to each of the determined quantizing steps including odd-number steps using a converting table, said converting table storing a respective variable-length quantized value in correspondence with a respective number of quantizing steps and a respective quantizing code so as to produce a variable-length quantized value of said input digital signal based on the corresponding number of quantizing steps and the corresponding quantizing code; and outputting said variable-length quantized value.

6. The method according to claim 5, further comprising receiving a first signal representing a plurality of sample values and receiving a second signal representing a plurality of predicted values corresponding to said sample values, and wherein said input digital signal represents a difference between the received first and second signals.

7. A method for quantizing an input digital signal, said method comprising the steps of:

receiving an input digital signal;

detecting a local characteristic of the received input digital signal;

selecting a plurality of quantizing steps including odd-numbered steps based on the detected local characteristic;

obtaining a quantizing code by quantizing the received input digital signal in response to each of the selected quantizing steps using a converting table, said converting table storing a respective variable-length quantized value in correspondence with a respective number of quantizing steps and a respective quantizing code so as to produce a variable-length quantized value of the received input digital signal based on the corresponding number of quantizing steps and the corresponding quantizing code; and outputting said variable-length quantized value with the corresponding quantizing step.

8. The method according to claim 7, further comprising receiving a first signal representing a plurality of sample values and receiving a second signal representing a plurality of predicted values corresponding to said sample values, and wherein said input digital signal represents a difference between the received first and second signals.

* * * * *